(12) United States Patent
Shimizu

(10) Patent No.: US 10,720,681 B2
(45) Date of Patent: Jul. 21, 2020

(54) HEAT DISSIPATION STRUCTURE AND BATTERY PROVIDED WITH THE SAME

(71) Applicant: SHIN-ETSU POLYMER CO., LTD., Tokyo (JP)

(72) Inventor: Takao Shimizu, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 0 days.

(21) Appl. No.: 16/247,585

(22) Filed: Jan. 15, 2019

(65) Prior Publication Data

US 2019/0221905 A1    Jul. 18, 2019

(30) Foreign Application Priority Data

Jan. 16, 2018 (JP) ................................ 2018-004621
Feb. 15, 2018 (NL) .................................... 2020444

(51) Int. Cl.

| | |
|---|---|
| *H01M 10/6551* | (2014.01) |
| *H01M 10/647* | (2014.01) |
| *H01M 10/613* | (2014.01) |
| *H01M 10/6556* | (2014.01) |
| *H01M 10/6557* | (2014.01) |
| *H01M 2/10* | (2006.01) |
| *H01M 10/653* | (2014.01) |

(52) U.S. Cl.
CPC ..... *H01M 10/6551* (2015.04); *H01M 2/1077* (2013.01); *H01M 10/613* (2015.04); *H01M 10/647* (2015.04); *H01M 10/653* (2015.04); *H01M 10/6556* (2015.04); *H01M 10/6557* (2015.04); *H01M 2220/10* (2013.01); *H01M 2220/20* (2013.01); *H01M 2220/30* (2013.01)

(58) Field of Classification Search
CPC ......... H01M 10/6551; H01M 10/6556; H01M 10/6557
See application file for complete search history.

(56) References Cited

U.S. PATENT DOCUMENTS

2017/0338532 A1* 11/2017 Mott ................... H01M 10/617

FOREIGN PATENT DOCUMENTS

JP          2008-243999 A     10/2008

* cited by examiner

*Primary Examiner* — Ula C Ruddock
*Assistant Examiner* — Armindo Carvalho, Jr.
(74) *Attorney, Agent, or Firm* — Hauptman Ham, LLP

(57) ABSTRACT

There is provided a heat dissipation structure adaptable to various forms of a heat source, light in weight, and excellent in heat dissipation efficiency, and a battery provided with the heat dissipation structure. The present invention relates to a heat dissipation structure for enhancing heat dissipation from a heat source, including: a heat conduction sheet in a spirally wound shape for conducting heat from the heat source; a cushion member provided on an annular back surface of the heat conduction sheet, and easily deformed corresponding to a surface shape of the heat source compared to the heat conduction sheet; and a through passage penetrating in a direction in which the heat conduction sheet in the wound shape runs, and a battery provided with the same.

20 Claims, 9 Drawing Sheets

-- Prior Art --

HEAT DISSIPATION STRUCTURE AND BATTERY PROVIDED WITH THE SAME

CROSS REFERENCE

The present application claims the benefit of priorities of Japanese Patent Application No. 2018-004621 filed on Jan. 16, 2018 in Japan and Netherlands Patent Application No. 2020444 filed on Feb. 15, 2018 in the Netherlands, the entire contents of which are incorporated herein by reference. The entire contents of patents, patent applications, and literatures cited in the present application are also incorporated herein by reference.

TECHNICAL FIELD

The present invention relates to a heat dissipation structure and a battery provided with the same.

BACKGROUND ART

A control system of automobiles, aircrafts, ships or electronic devices for home use or business use is further complicated with increased accuracy, and correspondingly the integration density of small electronic components on a circuit board is continued to increase. As a result, it is strongly requested to solve malfunction or shortening of lifetime of the electronic components due to heat generation of the periphery of the circuit board.

To implement rapid heat dissipation from the circuit board, conventionally, measures such as configuring the circuit board itself of a material excellent in heat dissipation, mounting a heat sink, and driving a heat dissipation fan are singly taken, or a plurality of these measures are combined to be taken. Among these, the measures of configuring the circuit board itself of the material excellent in heat dissipation, for example, diamond, aluminum nitride (AlN), cubic boron nitride (cBN), or the like, extremely increases the cost of the circuit board. Additionally, placement of the heat dissipation fan causes problems of malfunction of a rotating machine such as a fan, necessity of maintenance for preventing malfunction, and difficulty in securing of installation space. On the other hand, a heat dissipation fin is a simple member capable of increasing a surface area by forming many columnar or flat plate-like projection portions using high thermal conductive metal (for example, aluminum) to enhance heat dissipation, and therefore is generally used as a heat dissipation component (refer to Patent Document 1).

Recently, for the purpose of reduction in a load to global environment, movement to gradually convert a conventional gasoline-powered vehicle or a diesel vehicle into an electric automobile is becoming more active in the world. Particularly, China, as well as European countries including France, Netherlands, and Germany, declares to completely switch from gasoline-powered vehicles and diesel vehicles to electric automobiles by the year of 2040. For the spread of the electric automobiles, there are problems such as installation of many charging stands in addition to development of high performance batteries. Particularly, technological development for enhancing a charging/discharging function of a lithium automobile battery becoming a big problem. The fact that the automobile batteries cannot sufficiently exert a function of charging/discharging under a high temperature of at least 60 degrees Celsius is well known. Therefore, similarly to the circuit board previously described, it is important to enhance heat dissipation of the battery as well.

In order to implement rapid heat dissipation of the battery, a structure, in which a water-cooling pipe is disposed in a housing made of metal excellent in thermal conductivity such as aluminum, many battery cells are disposed in the housing, an adhesive rubber sheet is disposed between the battery cells and a bottom surface of the housing, is employed. Hereinafter, description is made with reference to the drawing.

FIG. 9 is a schematic sectional view of a conventional battery. A battery 100 of FIG. 9 includes many battery cells 101 on an inner bottom surface 103 of a housing 102 composed of aluminum or aluminum base alloy. In a bottom section 104 of the housing 102, water-cooling pipes 105 for allowing cooling water to flow are provided. The battery cells 101 are fixed to the inside of the housing 102 with a rubber sheet (for example, a sheet made of room temperature-curable silicone rubber) 106 interposed between the bottom section 104 and the battery cells. In the battery 100 having such a structure, heat of the battery cells 101 is transferred to the housing 102 through the rubber sheet 106, and effectively removed by water cooling.

CITATION LIST

Patent Literature

Patent Literature 1
  Japanese Patent Laid-Open No. 2008-243999

SUMMARY OF INVENTION

Technical Problem

However, the heat dissipation structure of the conventional battery 100 illustrated in FIG. 9 has the following problems to be solved. The thermal conductivity of the rubber sheet 106 is lower than that of aluminum or graphite, and therefore it is difficult to effectively move heat from the battery cells 101 to the housing 102. A method for interposing a spacer of graphite in place of the rubber sheet 106 is considered. However, lower surfaces of a plurality of the battery cells 101 are not flat but have steps, and therefore clearances occur between the battery cells 101 and the spacer, and heat transfer efficiency lowers. As seen in the example, the battery cells can take various forms (including unevenness such as a step or a surface state), and therefore a demand for being adaptable to the various forms of the battery cells and implementing high heat transfer efficiency is increasing. Furthermore, use of a more lightweight material for a container of the battery cell is demanded, and a heat dissipation structure corresponding to weight saving of the battery cell is desired. This is in common with not only the battery cell but also other heat sources such as a circuit board, an electronic component, and an electronic device body.

The present invention has been made in view of the above problems, and an object thereof is to provide a heat dissipation structure adaptable to various forms of a heat source, light in weight, and excellent in heat dissipation efficiency, and a battery provided with the heat dissipation structure.

Solution to Problem (1) A heat dissipation structure according to an embodiment for achieving the above object is a heat dissipation structure for enhancing heat dissipation from a heat source, including: a heat conduction sheet in a spirally wound shape for conducting heat from the heat source; a cushion member provided on an annular back surface of the heat conduction sheet, and easily deformed corresponding to a surface shape of the heat source compared to the heat conduction sheet; and a through passage penetrating in a direction in which the heat conduction sheet in the wound shape runs.

(2) A heat dissipation structure according to another embodiment preferably further includes an adhesion layer on an annular front surface of the heat conduction sheet, wherein, the cushion member, the heat conduction sheet, and the adhesion layer are sequentially constituted from the through passage toward radially outside.

(3) In a heat dissipation structure according to another embodiment, the cushion member preferably is a spiral cushion member spirally wound along the annular back surface of the heat conduction sheet.

(4) In a heat dissipation structure according to another embodiment, the cushion member preferably is a cylindrical cushion member having the through passage in a longitudinal direction thereof, and the heat conduction sheet is preferably spirally wound around an outer surface of the cylindrical cushion member.

(5) A battery according to an embodiment is a battery including: one or more battery cells as a heat source inside a housing having a structure of allowing a cooling agent to flow; and a heat dissipation structure for enhancing heat dissipation from the heat source, wherein the heat dissipation structure includes: a heat conduction sheet in a spirally wound shape for conducting heat from the heat source; a cushion member provided on an annular back surface of the heat conduction sheet, and easily deformed corresponding to a surface shape of the heat source compared to the heat conduction sheet; and a through passage penetrating in a direction in which the heat conduction sheet in the wound shape runs.

(6) In a battery according to another embodiment, the heat dissipation structure preferably further includes an adhesion layer on an annular front surface of the heat conduction sheet, wherein the cushion member, the heat conduction sheet, and the adhesion layer are sequentially constituted from the through passage toward radially outside.

(7) In a battery according to another embodiment, the cushion member preferably is a spiral cushion member spirally wound along the annular back surface of the heat conduction sheet, and the heat dissipation structure is preferably disposed at least between the heat source and the cooling agent.

(8) In a battery according to another embodiment, the cushion member preferably is a cylindrical cushion member having the through passage in a longitudinal direction thereof, the heat conduction sheet is preferably spirally wound around an outer surface of the cylindrical cushion member, and the heat dissipation structure is preferably disposed at least between the heat source and the cooling agent.

(9) In a battery according to another embodiment, the cushion member preferably is a cylindrical cushion member having the through passage in a longitudinal direction thereof, the heat conduction sheet is preferably spirally wound around an outer surface of the cylindrical cushion member, and the cylindrical cushion member is preferably configured to enable the cooling agent to flow in the through passage, and the heat dissipation structure is preferably disposed between the heat source and the housing, and/or between the heat sources.

Advantageous Effect of Invention

According to the present invention, it is possible to provide a heat dissipation structure adaptable to various forms of a heat source, light in weight, and excellent in heat dissipation efficiency, and a battery provided with the heat dissipation structure.

DESCRIPTION OF EMBODIMENTS

Now, embodiments of the present invention are each described with reference to the drawings. Each embodiment described below is not limited to the invention according to the scope of the claims, and all of various elements described in each embodiment, and all combination of these are not always essential for the solution of the present invention.

First Embodiment

Figure 1A:
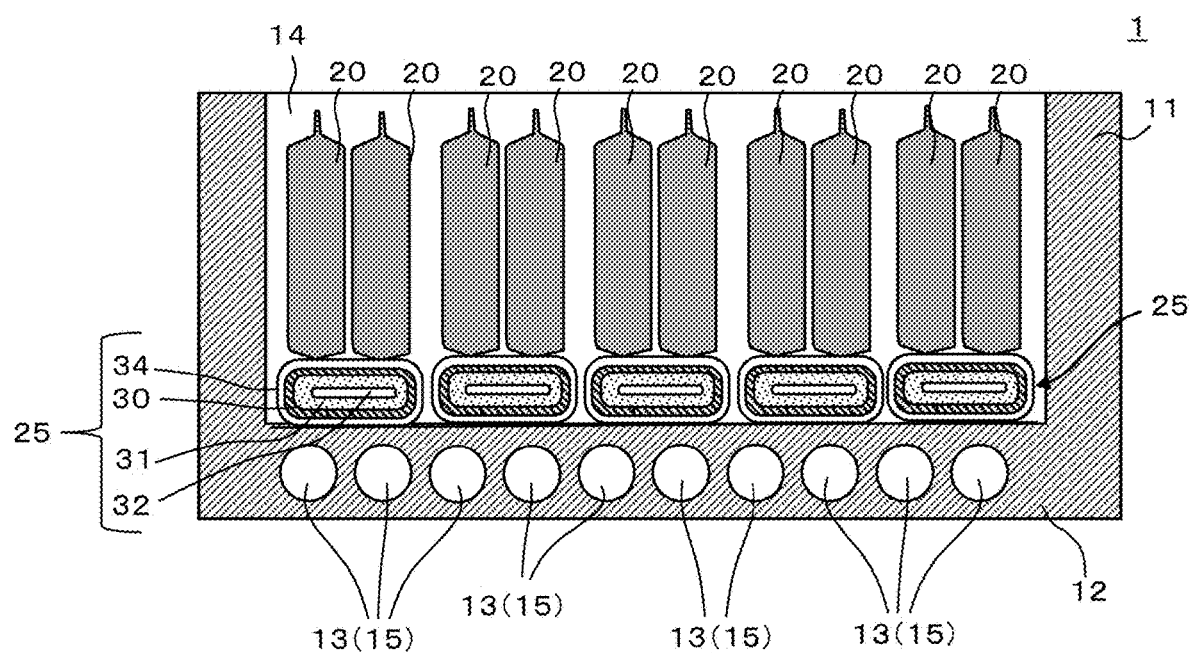
FIG. 1A shows a longitudinal sectional view of heat dissipation structures according to a first embodiment and a battery provided with the heat dissipation structures.
Figure 1B:
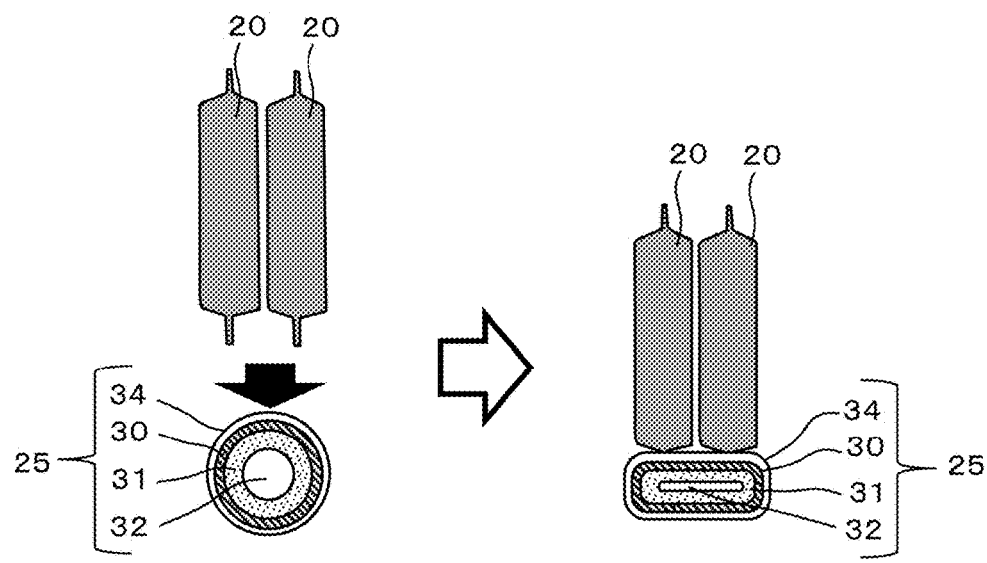
FIG. 1B shows a sectional view of form change of the heat dissipation structure before and after the heat dissipation structure is compressed by battery cells in FIG. 1A.

FIG. 1A shows a longitudinal sectional view of heat dissipation structures according to a first embodiment and a battery provided with the heat dissipation structures. FIG. 1B shows a sectional view of form change of the heat dissipation structure before and after the heat dissipation structure is compressed by battery cells in FIG. 1A.

As shown in FIG. 1, a battery 1 has a structure in which a plurality of battery cells 20 are provided in a housing 11 that brings cooling agents 15 into contact. Heat dissipation structures 25 are provided between ends (lower ends), close to the cooling agents 15, of the battery cells 20 as an example of heat sources, and a part (bottom section 12), close to the cooling agents 15, of the housing 11. Herein, the two battery cells 20 are placed on the one heat dissipation structure 25. However, the number of the battery cells 20 placed on the heat dissipation structure 25 is not limited to two.

The heat dissipation structures 25 are structures that enhance heat dissipation from the battery cells 20. The heat dissipation structures 25 each includes a heat conduction sheet 30 in a spirally wound shape for conducting heat from the battery cells 20, and a cushion member 31 provided on an annular back surface of the heat conduction sheet 30, and easily deformed corresponding to the surface shapes of the battery cells 20 compared to the heat conduction sheet 30. Each heat dissipation structure 25 has a through passage 32 penetrating in the direction in which the heat conduction sheet 30 in the wound shape runs. Each heat dissipation structure 25 preferably further includes an adhesion layer 34 on an annular front surface of the heat conduction sheet 30, and the cushion member 31, the heat conduction sheet 30, and the adhesion layer 34 are sequentially constituted from the through passage 32 toward the radially outside. Herein, each heat conduction sheet 30 is preferably made of a material excellent in thermal conductivity compared to the cushion member 31. Each cushion member 31 is preferably a cylindrical cushion member having a through passage 32 in the longitudinal direction thereof. Each heat conduction sheet 30 is spirally wound around an outer surface of the cylindrical cushion member. Each heat dissipation structure 25 has a substantially cylindrical shape when the battery cells 20 are not placed on the heat dissipation structure 25. However, when the battery cells 20 are placed on the heat dissipation structure 25, the heat dissipation structure 25 is compressed by the weight of the battery cells to become flat.

Each heat conduction sheet 30 is a belt-shaped sheet running in the longitudinal direction substantially cylindrically in a spirally wound manner around an outer surface of the heat dissipation structure 25. The heat conduction sheet 30 is a sheet containing at least one of metal, carbon, and ceramics, and has a function of conducting heat from the battery cells 20 to the cooling agents 15. In this application, a "cross-section" or a "longitudinal cross-section" means a cross-section in the direction of vertically cutting from an upper opening surface in the inside 14 of the housing 11 of the battery 1 to the bottom section 12.

Now, a schematic configuration of the battery and components of each heat dissipation structure 25 are described in more detail.

(1) Summary of Configuration of Battery

In this embodiment, the battery 1 is, for example, a battery for an electric automobile, and includes many battery cells 20. The battery 1 includes a bottomed housing 11 having an opening on one side. The housing 11 is preferably composed of aluminum or aluminum base alloy. The battery cells 20 are disposed in the inside 14 of the housing 11. On the upper sides of the battery cells 20, electrodes (not illustrated) are provided to be projected. The plurality of battery cells 20 are preferably closely adhered to each other by application of force in the compression direction from both sides by utilizing screws or the like, inside the housing 11 (not illustrated). In the bottom section 12 of the housing 11, one or a plurality of water-cooling pipes 13 are provided to allow cooling water as an example of cooling agents 15 to flow. The battery cells 20 are disposed inside the housing 11 such that the heat dissipation structures 25 are interposed between the bottom section 12 and the battery cells 20. In the battery 1 having such a structure, heat of the battery cells 20 is conducted to the housing 11 through the heat dissipation structures 25 to be effectively removed by the water cooling. The cooling agents 15 are not limited to cooling water and are interpreted to include an organic solvent such as liquid nitrogen and ethanol. The cooling agents 15 are not limited to liquid under a situation used for cooling but may be gas or a solid.

(2) Heat Conduction Sheet

The heat conduction sheet 30 is preferably a sheet containing carbon, and more preferably a sheet containing carbon filler and resin. The "carbon" mentioned in this application is widely interpreted to include any structure composed of carbon (symbol for an element: C) such as graphite, carbon black having lower crystallinity than graphite, expanded graphite, diamond, diamond-like carbon having a similar structure to diamond. In this embodiment, the heat conduction sheet 30 can be a thin sheet obtained by curing a material obtained by compounding and dispersing graphite fiber or carbon particles in resin. In place of graphite fiber or carbon particles, expanded graphite filler may be used. Expanded graphite is graphite becoming in an expanded state in the layer stacking direction by rapidly heating a graphite intercalation compound obtained by inserting substances into scaly graphite by chemical reaction, gasifying the substances between layers, and widening spaces between the layers of graphite by discharge of gas generated at this time. Additionally, the heat conduction sheet 30 may be carbon fiber woven in mesh or may be mixed spinning or mixed knitting. All fillers made of graphite fiber, carbon particles, carbon fiber, and expanded graphite are included in the concept of carbon filler.

In a case where resin is contained in the heat conduction sheet 30, the resin may exceed 50 mass % to the total mass of the heat conduction sheet 30, or may be 50 mass % or less. That is, as long as heat conduction is not affected seriously, it does not matter whether or not a main material of the heat conduction sheet 30 is resin. As the resin, for example, thermoplastic resin can be suitably used. As thermoplastic resin, resin having such a high melting point as not to cause melting when heat from the battery cells 20 as an example of a heat source is conducted is preferable, and examples of thermoplastic resin can suitably include polyphenylene sulfide (PPS), polyetheretherketone (PEEK), and polyamide imide (PAI). The resin disperses, for example, in a particulate state in clearances of carbon filler, in a state before the heat conduction sheet 30 is molded. In the heat conduction sheet 30, AlN or diamond may disperse as filler for further enhancing heat conduction, in addition to carbon filler, and resin. In place of resin, elastomer softer than resin may be used.

The heat conduction sheet 30 can be a sheet containing metal and/or ceramics in place of the aforementioned carbon or along with carbon. As the metal, metal having relatively high thermal conductivity such as aluminum, copper, and alloy containing at least one thereof can be selected. As the ceramics, ceramics having relatively high thermal conductivity such as AlN, cBN, and hexagonal boron nitride (hBN) can be selected.

It does not matter whether or not the heat conduction sheet 30 is excellent in electrical conductivity. The thermal conductivity of the heat conduction sheet 30 is preferably 10 W/mK or more. In this embodiment, the heat conduction sheet 30 is a belt-shaped plate of aluminum, aluminum alloy, copper, or stainless steel, and is composed of a material excellent in thermal conductivity and electrical conductivity.

The heat conduction sheet 30 is preferably a sheet excellent in bending performance (or flexibility). The thickness of the heat conduction sheet 30 is not limited, but is preferably 0.3 to 5 mm, and more preferably 0.3 to 1 mm. However, the thicker the thickness of the heat conduction sheet 30 is, the lower the thermal conductivity of the heat conduction sheet 30 is, and therefore the thickness thereof is preferably determined in comprehensive consideration of the strength, the flexibility, and the thermal conductivity of the sheet.

(3) Cushion Member

Important functions of the cushion member 31 are deformability and restoring force. The deformability is a characteristic necessary for following the shapes of the battery cells 20. Particularly, in the case of the battery cell 20 housed in a package easily deforming semisolid material such as lithium ion battery, a content having a liquid shape and the like, design dimension is often an indeterminate form, or dimensional accuracy is not often increased. Therefore, holding of restoring force for holding deformability or follower force of the cushion member 31 is important.

The cushion member 31 is a cylindrical cushion member including the through passage 32 in this embodiment. Even in a case where the lower ends of the plurality of battery cells 20 are not flat, the cushion member 31 improves contact between the heat conduction sheet 30 and the lower ends. The through passage 32 contributes to facilitation of deformation of the cushion member 31 and has a function of enhancing the contact between the heat conduction sheet 30 and the lower ends of the battery cells 20. The cushion member 31 has a function as a protective member preventing the heat conduction sheet 30 from being damaged or the like due to load applied to the heat conduction sheet 30, in addition to a function of exerting a cushioning characteristic between the battery cells 20 and the bottom section 12. In this embodiment, the cushion member 31 is a member having lower thermal conductivity than the heat conduction sheet 30.

The cushion member 31 is preferably composed to include thermosetting elastomer such as silicone rubber, urethane rubber, isoprene rubber, ethylene-propylene rubber, natural rubber, ethylene-propylene-diene rubber, nitrile rubber (NBR), and styrene-butadiene rubber (SBR); urethane-based, ester-based, styrene-based, olefin-based, butadiene-based, or fluorine-based thermoplastic elastomer, or composite thereof. The cushion member 31 is preferably composed of a material having such a heat-resisting property that the form can be maintained without being molten or decomposed by heat conducted to the heat conduction sheet 30. In this embodiment, the cushion member 31 is more preferably composed of a material obtained by impregnating silicone into urethane-based elastomer, or silicone rubber. The cushion member 31 may be composed by dispersing filler represented by, for example, particles of AlN, cBN, hBN, or diamond into rubber, to enhance thermal conductivity even a little. The cushion member 31 may include bubbles therein or may not include bubbles. The "cushion member" means a deformable member rich in flexibility, and capable of being closely adhered to a surface of a heat source and can be replaced with a "rubber elastic body" in this meaning. Furthermore, as a modification of the cushion member 31, the cushion member 31 can be composed by not using the above rubber elastic body but using metal. For example, the cushion member can be composed of spring steel. Furthermore, as the cushion member, a coil spring can be disposed. Additionally, spirally wound metal may be used as spring steel, and disposed on the annular back surface of the heat conduction sheet 30 as the cushion member.

(4) Adhesion Layer

The adhesion layer 34 is a layer capable of being further provided on the annular front surface of the heat conduction sheet 30. In the heat dissipation structure 25, the cushion member 31, the heat conduction sheet 30, and the adhesion layer 34 are sequentially constituted from the through passage 32 toward the radially outside. In the first embodiment, the second embodiment, and subsequent embodiments, the adhesion layer 34 is provided on a surface of only the heat conduction sheet 30 but can be also provided on the cushion member 31. Furthermore, a cylinder as a form of the adhesion layer 34 may be covered on a cylindrical body obtained by spirally winding the heat conduction sheet 30 on a surface of the cushion member 31.

The adhesion layer 34 can be formed of various kinds of elastic bodies similarly to the above cushion member 31 but needs to rapidly conduct heat from the battery cells 20 to the heat conduction sheet 30, and therefore is preferably a sheet containing silicone rubber excellent in thermal conductivity. In a case where the adhesion layer 34 is mainly composed of silicone rubber, filler having high thermal conductivity such as AlN and aluminum is preferably dispersed into silicone rubber. As the adhesion layer 34 made of silicone rubber, silicone rubber obtained by combining silicone resin with bifunctional silicone crude rubber can be exemplified to enhance adhesiveness. As the silicone resin, MQ resin can be suitably exemplified. The MQ resin is resin obtained by crosslinking only a four-way branch type Q unit having a structure of bonding an oxygen atom to four atomic bonding of Si and adding a one-way branch type M unit having a structure of bonding an oxygen atom to one atomic bonding of Si to stop reactivity of an end. As the silicone resin, use of resin of bonding many hydroxyl groups is preferable, since the adhesiveness of silicone rubber can be enhanced.

The adhesion layer 34 has a function of enhancing adhesion between the battery cells 20 and the heat conduction sheet 30, or adhesion between the periphery of the cooling agents 15 (such as the bottom section 12, and side walls of the housing 11)) and the heat conduction sheet 30. As long as the adhesion layer 34 has a heat-resisting property and adhesiveness, hardness does not particularly matter. Particularly, a sheet composed of silicone rubber as a main material has hardness of 60 degrees or less, preferably 40 degrees or less, more preferably 10 degrees or less according to the Shore OO standards. This is because the lower the hardness of the adhesion layer 34 is, the more easily unevenness on the surfaces of the battery cells 20 is absorbed. The thickness of the adhesion layer 34 is preferably 0.005 to 0.5 mm, more preferably 0.01 to 0.3 mm, much more preferably 0.02 to 0.2 mm, not to excessively increase thermal resistance. The adhesion layer 34 preferably has a thicker thickness to enhance adhesive strength. When the adhesive strength of the adhesion layer 34 is enhanced, a merit that the heat dissipation structure 25 easily follows expansion and contraction of the battery cells 20 is obtained. Particularly, like a heat dissipation structure 25d (refer to FIG. 8A) described below, in a case where not only the heat conduction sheet 30 but also the whole of the heat dissipation structure 25d are formed in a spiral shape, the heat dissipation structure 25d itself can follow the expansion and contraction of the battery cells 20. In the viewpoint of harmonization of reduction in thermal resistance of the adhesion layer 34 with enhancement of the adhesive strength of the adhesion layer 34, the thickness of the adhesion layer 34 is preferably 0.02 to 1.0 mm, more preferably 0.05 to 0.7 mm, much more preferably 0.1 to 0.5 mm. However, the thickness of the adhesion layer 34 is preferably determined in accordance with conditions such as unevenness of the surfaces of the battery cells 20 and rubber hardness. The adhesion layer 34 is not provided on the heat dissipation structure 25 side but may be provided on the battery cells 20 side in contact with the heat dissipation structure 25. The adhesion layer 34 is not an essential configuration for the heat dissipation structure 25 or the battery 1, but an additional configuration capable of being suitably provided. This is also applicable to the second embodiment and the subsequent embodiments.

Figure 2:
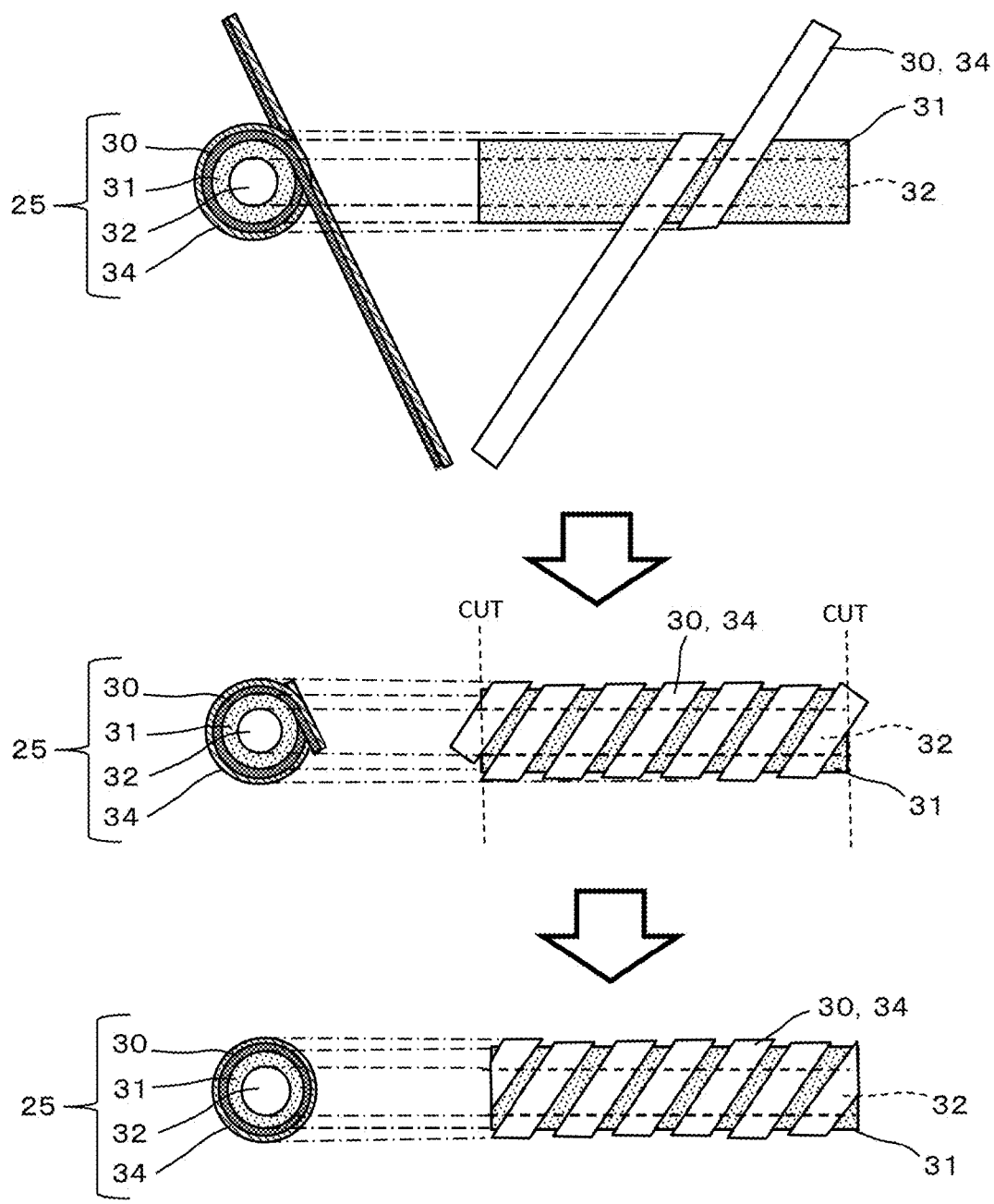
FIG. 2 shows a diagram for illustrating a part of a manufacturing method of the heat dissipation structure of FIG. 1A.

FIG. 2 shows a diagram for illustrating a part of a manufacturing method of the heat dissipation structure of FIG. 1A.

First, the cushion member 31 is molded. Next, an adhesive agent, an adhesive sheet or the like is served to a surface opposite to the adhesion layer 34, and the belt-shaped heat conduction sheet 30 provided with the adhesion layer 34 is spirally wound around the outer surface of the cushion member 31. At this time, when the outer surface of the cushion member 31 has adhesiveness, the adhesive agent or the like is unnecessary. Finally, when portions protruding from both ends of the cushion member 31 of the belt-shaped heat conduction sheet 30 with the adhesion layer 34 exist, the portions are cut. The heat dissipation structure 25 thus completed has a form of projecting by the respective thicknesses of the adhesion layer 34 and the heat conduction sheet 30 with respect to the outer surface of the cushion member 31. Like an example described below, the heat conduction sheet 30 and the cushion member 31, or the adhesion layer 34 and the cushion member 31 may be flushed.

The adhesion layer 34 may be formed at the last of the manufacturing process of the heat dissipation structure 25. For example, after the belt-shaped heat conduction sheet 30 not provided with any adhesion layer 34 is spirally wound around the outer surface of the cushion member 31, the adhesion layer 34 may be formed on at least the surface of the heat conduction sheet 30. As a forming method of the adhesion layer 34, a method for coating at least the surface of the heat conduction sheet 30 with liquid curable composition that becomes the adhesion layer 34 after curing or covering the cylindrical adhesion layer 34 on the cushion member 31 with the heat conduction sheet 30 wound therearound can be exemplified.

Figure 3:
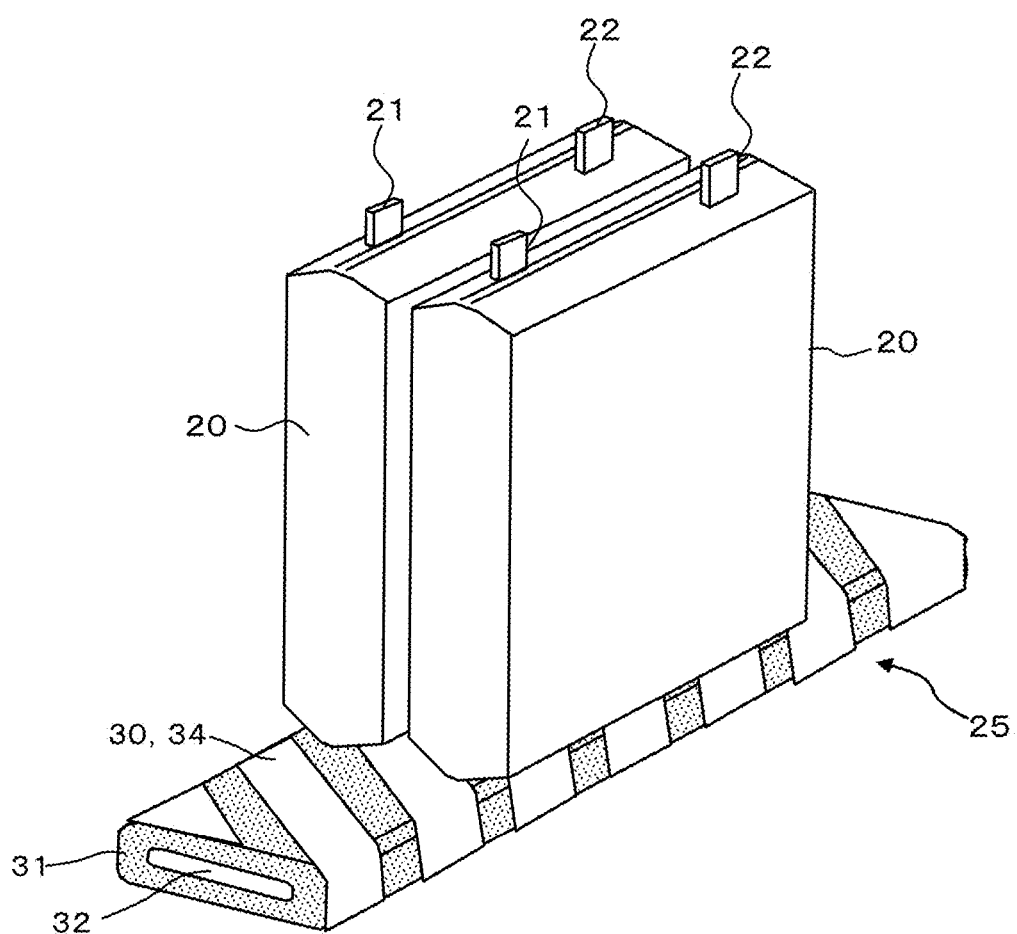
FIG. 3 shows a perspective view of a state where the heat dissipation structure is disposed directly under the battery cells.

FIG. 3 shows a perspective view of a state where the heat dissipation structure is disposed directly under the battery cells.

As shown in FIG. 3, each heat dissipation structure 25 inside the housing 11 contacts with lower ends, located on a side opposite to the electrodes 21, 22, of the two battery cells 20, and is in a vertically compressed state. The heat dissipation structure 25 has a structure of spirally winding the heat conduction sheet 30 around the outer surface of the cushion member 31 and does not excessively constrain deformation of the cushion member 31.

Second Embodiment

Now, a heat dissipation structure according to a second embodiment and a battery provided with the heat dissipation structure are described. Portions common with those of the first embodiment are denoted by the same reference numerals, and overlapped description is omitted.

Figure 4A:
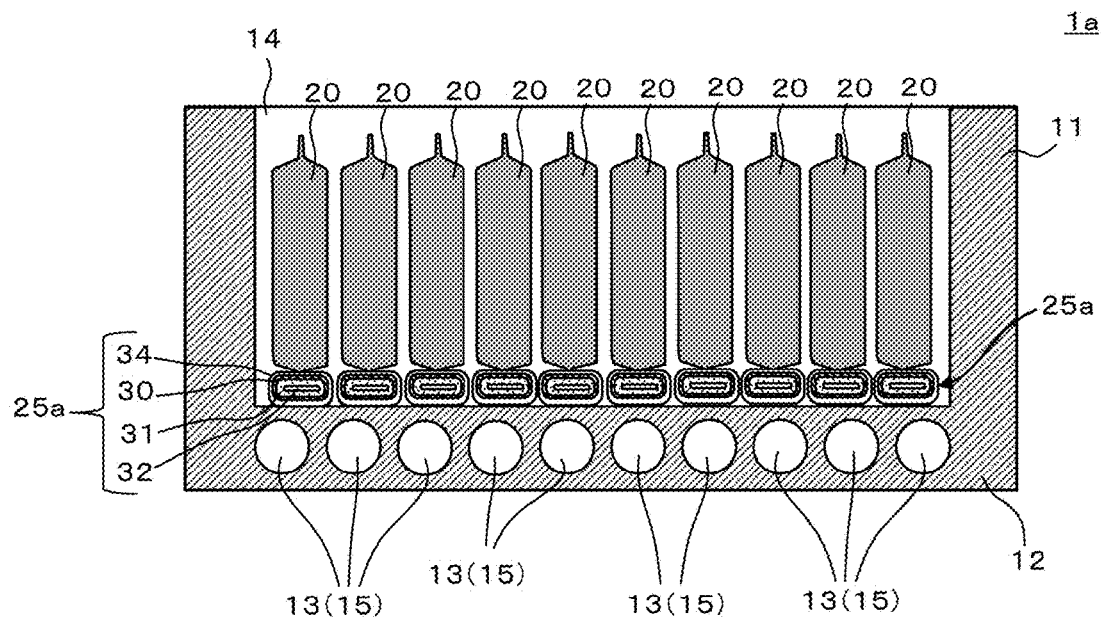
FIG. 4A shows a longitudinal sectional view of heat dissipation structures according to a second embodiment and a battery provided with the heat dissipation structures.
Figure 4B:
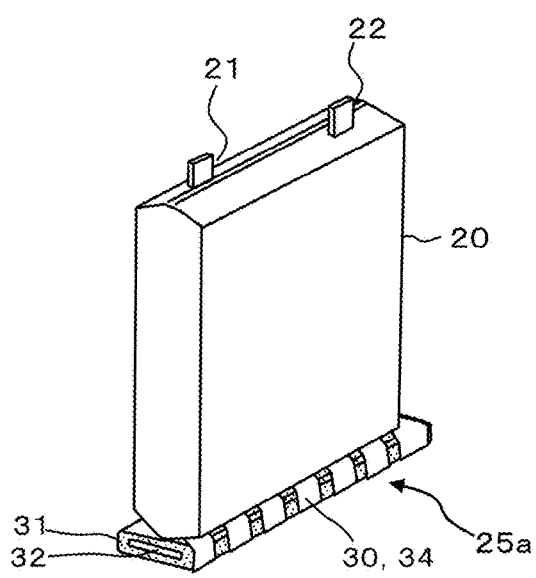
FIG. 4B shows a perspective view of a state of disposing the heat dissipation structure directly under a battery cell.
Figure 4C:
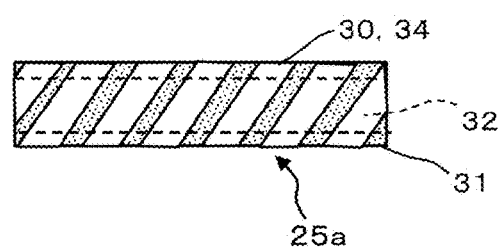
FIG. 4C shows a plan view of the heat dissipation structure.

FIG. 4A shows a longitudinal sectional view of heat dissipation structures according to a second embodiment and a battery provided with the heat dissipation structures. FIG. 4B shows a perspective view of a state of disposing the heat dissipation structure directly under a battery cell. FIG. 4C shows a plan view of the heat dissipation structure.

A heat dissipation structure 25a according to the second embodiment is different from the heat dissipation structure 25 according to the first embodiment in that the heat dissipation structure is a cylindrical body having an enough diameter to allow one battery cell 20 to be placed, and an outer surface of an adhesion layer 34 and an outer surface of a cushion member 31 (cylindrical cushion member) are flushed in the heat dissipation structure 25a, and other points are common.

Specifically, in this embodiment, the number of the disposed heat dissipation structures 25a is the same as the number of the battery cells 20 inside a housing 11 of a battery 1a. A heat conduction sheet 30 with the adhesion layer 34 slightly bites inward from an outer surface of the cushion member 31, and the outer surface of an adhesion layer 34 and the outer surface of a cushion member 31 are flushed. A surface of the heat conduction sheet 30 and a surface of the cushion member 31 may be flushed, and the adhesion layer 34 may project outward slightly. When the battery cell 20 is placed on the heat dissipation structure 25a, the heat dissipation structures 25a are vertically compressed by the weight of the battery cell 20, similarly to the heat dissipation structure 25 according to the first embodiment.

Third Embodiment

Now, a heat dissipation structure according to a third embodiment and a battery provided with the heat dissipation structure are described. Portions common with those of each of the above embodiments are denoted by the same reference numerals, and overlapped description is omitted.

Figure 5A:
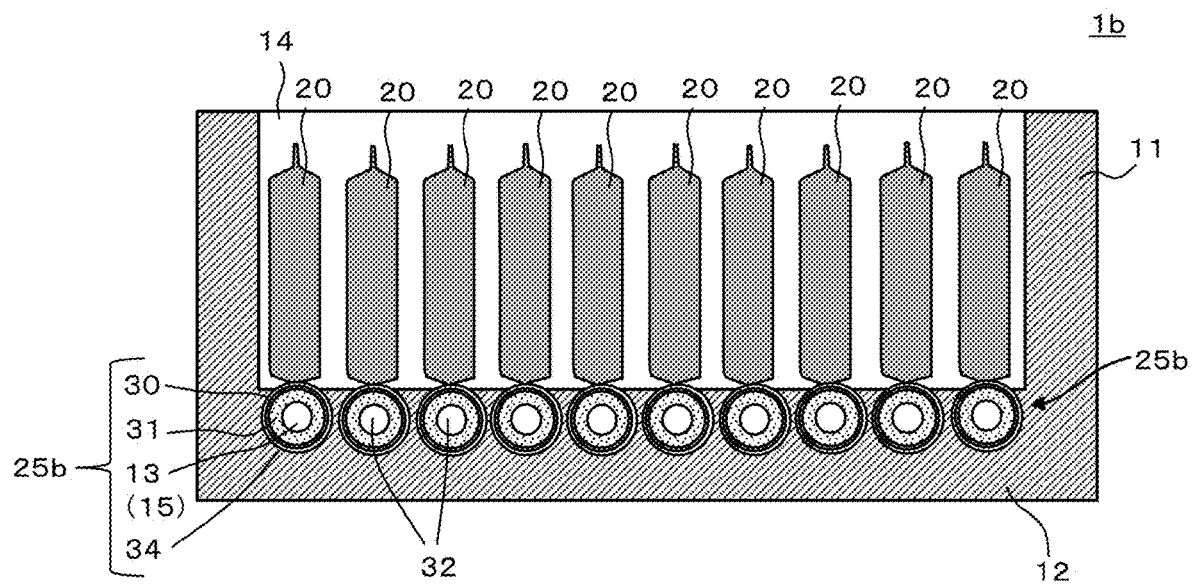
FIG. 5A shows a longitudinal sectional view of heat dissipation structures according to a third embodiment and a battery provided with the heat dissipation structures.
Figure 5B:
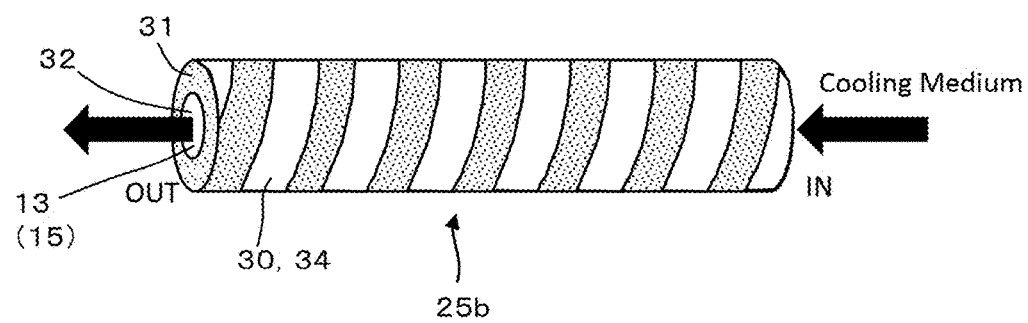
FIG. 5B shows a perspective view of a situation where a cooling agent flows in the heat dissipation structure.

FIG. 5A shows a longitudinal sectional view of heat dissipation structures according to a third embodiment and a battery provided with the heat dissipation structures. FIG. 5B shows a perspective view of a situation where a cooling agent flows in the heat dissipation structure.

A battery 1b according to this embodiment includes heat dissipation structures 25b in a housing 11, in place of the water-cooling pipes 13 provided in the battery 1 according to the first embodiment. That is, the heat dissipation structure 25b also has a function as a cooling pipe for allowing a cooling agent (may be referred to as a cooling medium) 13 to flow in a through passage. As shown in FIG. 5A, the housing 11 preferably includes recesses for fitting the heat dissipation structures 25b therein in an inner bottom surface of a bottom section 12. Herein, the one battery cell 20 is disposed inside the housing 11 to contact with the one heat dissipation structure 25b. A cushion member 31 composing each heat dissipation structure 25b preferably has enough hardness not to close the through passage 32 by the weight of the battery cell 20.

FIG. 5A omits a pipe for flowing water connected to both sides of each heat dissipation structure 25b. When the ends of each heat dissipation structure 25b are connected through the pipe for flowing water, a cooling path for allowing the cooling agent 13 such as cooling water to flow from the end of the one heat dissipation structure 25b through a plurality of heat dissipation structures 25b is constructed. One long heat dissipation structure 25b is prepared and is disposed to go and return in a snaking manner, so that the cooling agent such as cooling water can flow from an end of the heat dissipation structure 25b to the other end. That is, the heat dissipation structure 25b can be used as a water-cooling pipe itself.

Fourth Embodiment

Now, a heat dissipation structure according to a fourth embodiment and a battery provided with the heat dissipation structure are described. Portions common with those of each of the above embodiments are denoted by the same reference numerals, and overlapped description is omitted.

Figure 6:
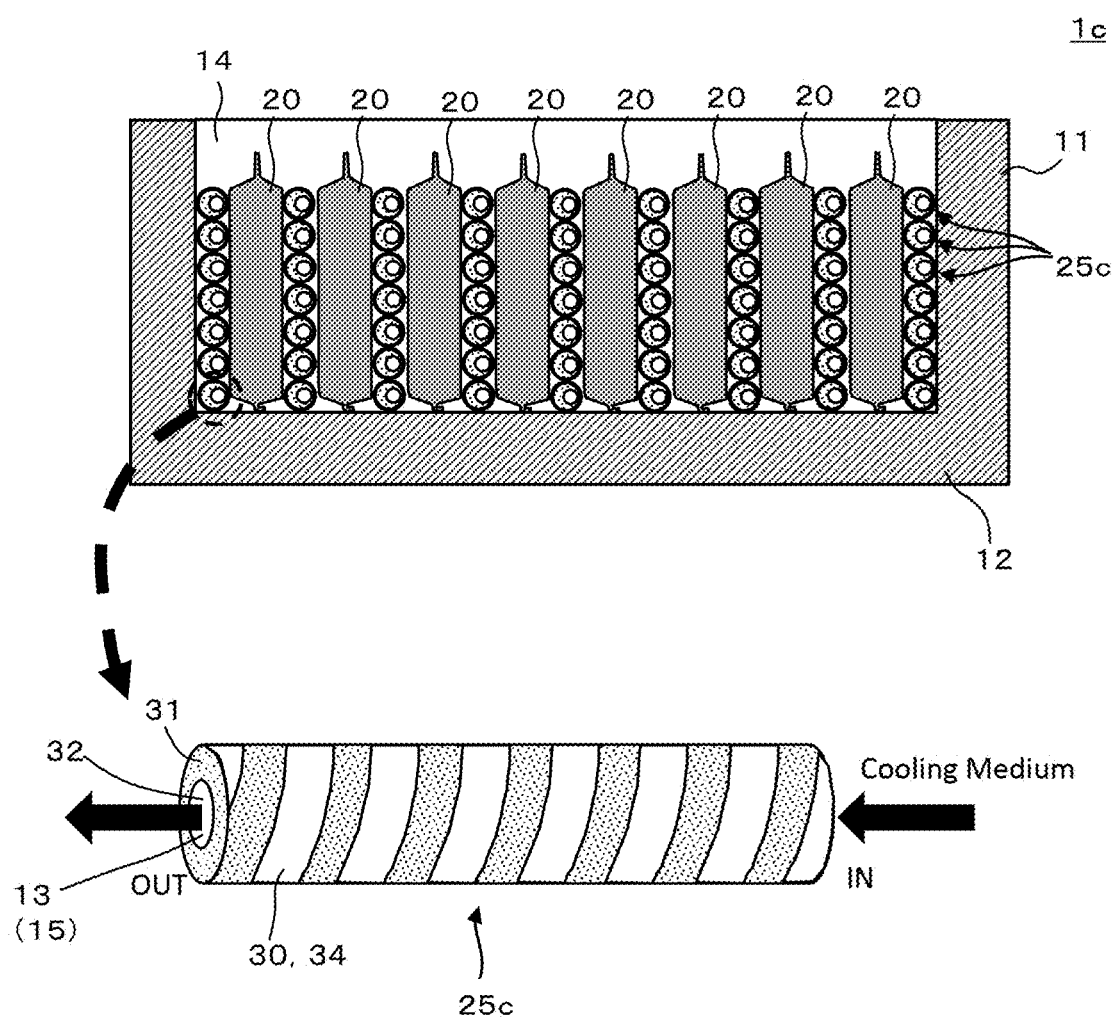
FIG. 6 shows a longitudinal sectional view of heat dissipation structures according to a fourth embodiment, a battery provided with the heat dissipation structures, and a perspective view of a situation where a cooling agent flows in the heat dissipation structure.

FIG. 6 shows a longitudinal sectional view of heat dissipation structures according to a fourth embodiment, a battery provided with the heat dissipation structures, and a perspective view of a situation where a cooling agent flows in the heat dissipation structure.

A battery 1c according to this embodiment includes heat dissipation structures 25c not in lower ends of battery cells 20, but in clearances between the battery cells 20 and an inner side surface of an inside 14 of a housing 11, and clearances between the battery cells 20. In FIG. 6, a plurality of the heat dissipation structures 25c are disposed such that the longitudinal directions of the heat dissipation structures 25c are the direction of the front and rear sides of the paper of FIG. 6. However, one long heat dissipation structure 25c may be disposed to go and return in a snaking manner to be disposed in the above clearances. In this case, only the number of the above clearances is sufficient as the number of the heat dissipation structures 25c. Furthermore, when the one long heat dissipation structure 25c is disposed in all the clearances by a method for disposing the one long heat dissipation structure 25c in one clearance in a snaking manner, and disposing the one long heat dissipation structure 25c in a clearance adjacent to the above clearance in a snaking manner, only the one heat dissipation structure 25c is required.

The heat dissipation structures 25c are not disposed between lower ends of the battery cells 20 and an inner bottom surface of a bottom section 12 of the housing 11 in FIG. 6 but may be disposed between theses. Additionally, the heat dissipation structure 25c may be disposed to be wound around an outer periphery of the one battery cell 20. At this time, the heat dissipation structures 25c may be wound around the outer periphery of the battery cell 20, and then may be wound around an outer periphery of a battery cell 20 adjacent to the above battery cell 20. Each heat dissipation structure 25c is used by allowing a cooling agent 15 to flow in a through passage 32 like the heat dissipation structures 25b previously described. However, like the first embodiment, water-cooling pipes 13 may be disposed in the bottom section 12 of the housing 11 not to allow the cooling agents 15 to flow in the heat dissipation structures 25c.

Fifth Embodiment

Now, a heat dissipation structure according to a fifth embodiment and a battery provided with the heat dissipation structure are described. Portions common with those of each of the above embodiments are denoted by the same reference numerals, and overlapped description is omitted.

Figure 7:
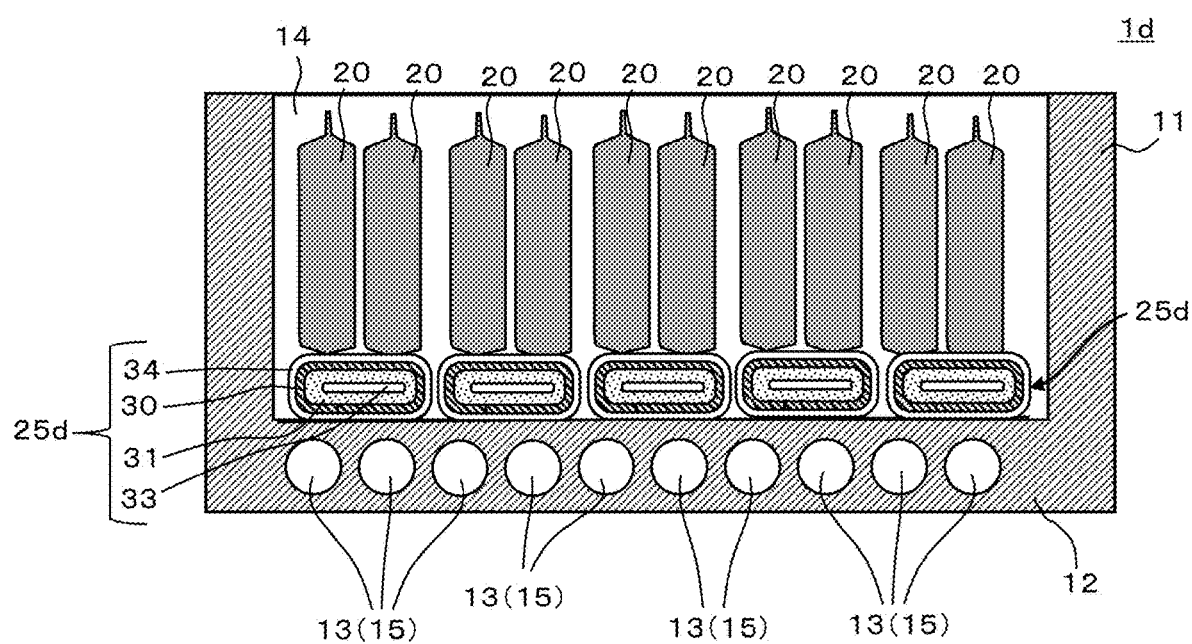
FIG. 7 shows a longitudinal sectional view of heat dissipation structures according to a fifth embodiment and a battery provided with the heat dissipation structures.
Figure 8A:
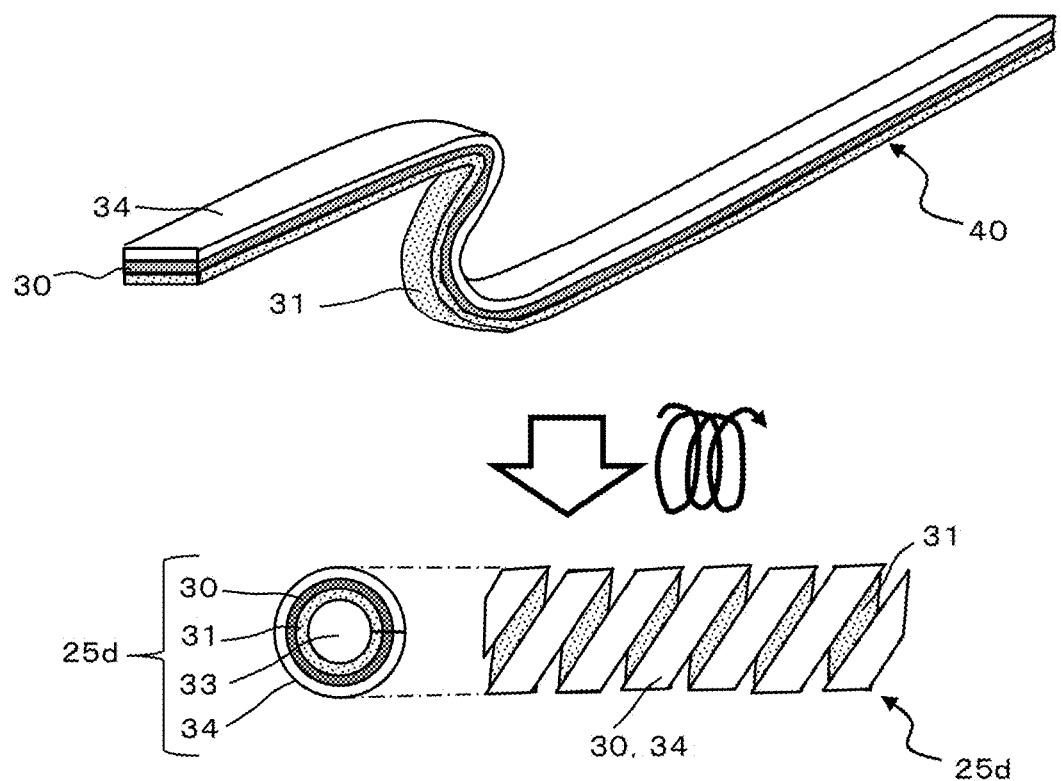
FIG. 8A shows a part of a manufacturing situation of the heat dissipation structure of FIG. 7.
Figure 8B:
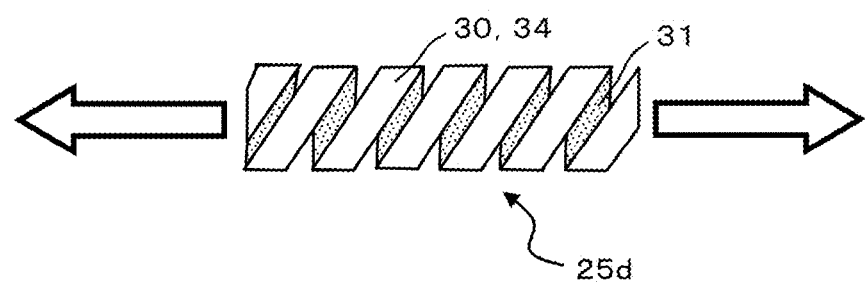
FIG. 8B shows a plan view of the heat dissipation structure completed by the manufacturing method of FIG. 8A.
Figure 9:
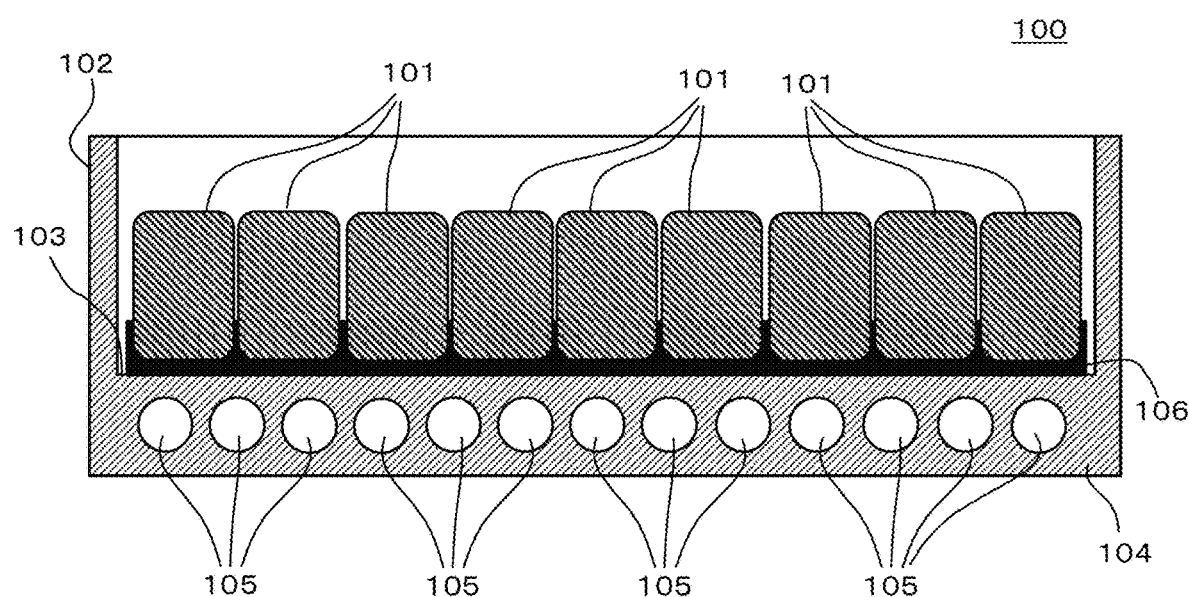
FIG. 9 has a schematic sectional view of a conventional battery.

FIG. 7 shows a longitudinal sectional view of heat dissipation structures according to a fifth embodiment and a battery provided with the heat dissipation structures. FIG. 8A shows a part of a manufacturing situation of the heat dissipation structure of FIG. 7. FIG. 8B shows a plan view of the heat dissipation structure completed by the manufacturing method of FIG. 8A.

A battery 1d according to the fifth embodiment includes heat dissipation structures 25d different from the heat dissipation structures 25 disposed inside the battery 1 according to the first embodiment and has other structures common with the battery 1. In each heat dissipation structure 25d used in this embodiment, a cushion member 31 is not a cylindrical cushion member, but a belt-shaped cushion member provided on a back side of a heat conduction sheet 30 and is a spiral cushion member spirally wound around together with the heat conduction sheet 30.

An example of a manufacturing method of the heat dissipation structure 25d provided with the above spiral cushion member 31 (also referred to as "spiral cushion member") is as follows.

First, a laminated body 40 composed of three layers of an adhesion layer 34, the heat conduction sheet 30, and the cushion member 31 having substantially equal widths is manufactured. Next, the laminated body 40 is spirally (also referred to as in a "coil shape") wound to run in one direction. Thus, the heat dissipation structure 25d having an elongated shape, and obtained by spirally winding the laminated body 40 is completed. The adhesion layer 34 may be formed to be finally applied on the heat conduction sheet 30.

The heat dissipation structure 25d includes a through passage 33 that penetrates in the longitudinal direction thereof and penetrates also in the outer surface direction of the heat dissipation structures 25d, unlike the heat dissipation structure 25 according to the first embodiment. Therefore, the through passage 33 of the heat dissipation structure 25d is not suitable to allow the cooling agent 15 such as cooling water to flow. However, the shape itself of the heat dissipation structure 25d is spiral, and therefore more easily extends and contracts in the longitudinal direction (white arrow direction of FIG. 8B) of the heat dissipation structures 25d, compared to the above heat dissipation structure 25.

The heat dissipation structure 25d can be disposed not only between battery cells 20 and a bottom section 12 of a housing 11, but also in clearances between the battery cells 20 and an inner side surface of the housing 11, and/or in clearances between the battery cells 20, similarly to the battery 1c according to the fourth embodiment. Furthermore, one long heat dissipation structure 25d is prepared, and is wound around an outer periphery of one battery cell 20 or is wound around an outer periphery of one battery cell 20, and thereafter wound around an outer periphery of a battery cell 20 adjacent to the above battery cell 20, so that the one long heat dissipation structure 25d can be continuously wound around a plurality of the battery cell 20.

Action and Effects of Each Embodiment

As described above, the heat dissipation structures 25, 25a, 25b, 25c, 25d (also referred to as the "heat dissipation structure 25 and the like", in a case where the heat dissipation structures are collectively referred) are heat dissipation structures that enhance heat dissipation from the battery cells 20, and each include the heat conduction sheet 30 in the spirally wound shape for conducting heat from the battery cell(s) 20, and the cushion member 31 provided on an annular back surface of the heat conduction sheet 30, and easily deformed corresponding to the surface shape(s) of the battery cell(s) 20 compared to the heat conduction sheet 30, and each have the through passage 32 or 33 penetrating in the direction in which the heat conduction sheet 30 in the wound shape runs. The batteries 1, 1a, 1b, 1c, 1d (also referred to as the "battery 1 and the like", in a case where the batteries are collectively referred.) each include one or more battery cells 20 inside the housing 11 having a structure for allowing the cooling agent(s) 15 to flow, and include the above heat dissipation structures 25 or the like to contact with the battery cell(s) 20.

Therefore, the heat dissipation structures 25 and the like are structures adaptable to various forms of the battery cells 20 and excellent also in heat dissipation efficiency, resulting from the cushion members 31 and the through passages 32, 33 disposed on the back surfaces of the heat conduction sheets 30. The heat dissipation structures 25 and the like become lightweight resulting from the through passages 32, 33.

The heat dissipation structures 25 and the like further include adhesion layers 34 on the annular front surfaces of the heat conduction sheets 30, and the cushion members 31, the heat conduction sheets 30, the adhesion layers 34 are sequentially constituted from the through passages 32, 33 toward the radially outside. Therefore, in a case where the heat conduction sheets 30 are composed of relatively high composite materials such as metal and carbon, when the heat conduction sheets 30 are configured to contact with the surfaces of the battery cells 20 through the adhesion layers 34, thermal conductivity from the battery cells 20 to the heat conduction sheets 30 can be further enhanced.

In the heat dissipation structure 25d, the cushion member 31 is a spiral cushion member spirally wound along the annular back surface of the heat conduction sheet 30. In the battery 1d, the heat dissipation structures 25d are disposed at least between the battery cell 20 and the cooling agents 15. The heat dissipation structures 25d may be disposed between the inner side surface of the housing 11 and the battery cells 20, and/or between the battery cells 20. The whole heat dissipation structures 25d have spiral shapes, and therefore are more adaptable to various sizes of the battery cells 20. More specific description is as follows. Even in a case of including the heat conduction sheets 30 having high rigidity, the heat conduction sheets 30 can be deformed by low load to be followed and closely adhered to the surfaces of the battery cells 20. Furthermore, even in partially different deformation amounts, close adhesive following is improved. The cushion members 31 are spirally cut, and therefore can be deformed as if each spiral of one rotation is substantially independent. Therefore, the heat dissipation structures 25d can enhance the freedom of local deformation. In addition, the heat dissipation structures 25d include not only the through passages 33, but also spiral through grooves penetrating from the through passages 33 to side surfaces, and therefore become lightweight.

The cushion members 31 composing the heat dissipation structures 25, 25a, 25b, 25c are cylindrical cushion members having the through passages 32 in the longitudinal directions thereof, and the heat conduction sheets 30 are spirally wound around the outer surfaces of the cylindrical cushion members. The batteries 1, 1a, 1b, 1c include the heat dissipation structures 25, 25a, 25b, 25c in contact with the battery cells 20 in the housings 11. The heat conduction sheets 30 partially cover the outer surfaces of the cylindrical cushion members and are spirally wound in the longitudinal directions of the cylindrical cushion members. In the batteries 1, 1a, 1b, 1c, the heat dissipation structures 25, 25a, 25b, 25c are disposed at least between the battery cell 20 and the cooling agents 15. Therefore, the heat dissipation structures 25, 25a, 25b, 25c are not unlikely to be constrained by the heat conduction sheets 30 and are deformable by following unevenness of the surfaces of the battery cells 20.

In batteries 1, 1a, 1b, 1c, the cushion members 31 are cylindrical cushion members having the through passages 32 in the longitudinal direction thereof, the heat conduction sheets 30 are spirally wound around the outer surfaces of the cylindrical cushion members, and the cylindrical cushion members are configured to enable the cooling agents 15 to flow in the through passages 32. In the batteries 1, 1a, 1b, 1c, the heat dissipation structures 25, 25a, 25b, 25c are disposed between the battery cells 20 and the housings 11, and/or between the battery cells 20. Therefore, the heat dissipation structures 25, 25a, 25b, 25c may have functions as water-cooling pipes (also referred to as cooling pipes) and may not include the water-cooling pipes 13 in the housings 11 of the batteries 1, 1a, 1b, 1c. At this time, the batteries 1, 1a, 1b, 1c also contribute to reduction in weight.

Other Embodiments

As described above, the preferred respective embodiments of the present invention are described. However, the present invention is not limited to these, and can be variously deformed to be implemented.

For example, the heat source includes not only the battery cell 20 but also all objects that generate heat of a circuit board, an electronic device body, and the like. For example, the heat source may be an electronic component such as a capacitor and an IC chip. Similarly, the cooling agent 15 may be not only water for cooling, but also an organic solvent, liquid nitrogen, gas for cooling. The heat dissipation structures 25 and the like may be disposed in structures other than the battery 1 and the like such as electronic devices, home electric appliances, and power generators.

The width of the spiral cushion member 31 in the heat dissipation structures 25d is not limited to the width of the heat conduction sheet 30 and may be larger or smaller than the width of the heat conduction sheet 30. The heat dissipation structure 25b is not limited to a form of being fitted or burying into the bottom section 12 but may be disposed on an inner bottom surface of the bottom section 12 or disposed in a form of being fitted or burying into the inner side surface of the housing 11, for example. The adhesion layer 34 may be formed not on a whole of a surface on the front side of the heat conduction sheet 30, but in only a contact region with the heat source such as the battery cells 20. For example, the adhesion layer 34 is not disposed between the heat conduction sheet 30 and the bottom section 12 of the housing 11, but the adhesion layer 34 can be provided in a contact region between the heat conduction sheet 30 and the battery cells 20.

A plurality of the components of each of the above embodiments can be freely combined except impossible combination. For example, the heat dissipation structure 25d according to the fifth embodiment may be disposed in place of the heat dissipation structure 25b according to the third embodiment. In this case, the cooling agent 15 separately needs to flow in the bottom section 12 or a side wall of the housing 11.

INDUSTRIAL APPLICABILITY

The heat dissipation structure according to the present invention can be utilized for, for example, various electronic devices such as automobiles, industrial robots, power generators, PCs, household electric appliances, in addition to batteries for automobiles. The battery according to the present invention can be utilized for batteries for electronic devices such as household batteries capable of charging/discharging and PCs, in addition to batteries for automobiles.

The invention claimed is:
1. A heat dissipation structure, comprising:
    a heat conduction sheet in a spirally wound shape, wherein the heat conduction sheet extends in a first direction, and the heat conduction sheet is configured to conduct heat from a heat source;

a cushion, wherein a deformability of the cushion is greater than a deformability of the heat conduction sheet, and on an annular inner surface of the heat conduction sheet;

a through passage extending in the first direction, wherein the cushion surrounds the through passage.

2. The heat dissipation structure of claim 1, further comprising an adhesion layer on an annular outer surface of the heat conduction sheet.

3. The heat dissipation structure of claim 1, wherein the cushion comprises a spiral cushion spirally wound along the annular inner surface of the heat conduction sheet.

4. The heat dissipation structure of claim 1, wherein the cushion comprises a cylindrical cushion having the through passage in a longitudinal direction thereof.

5. The heat dissipation structure of claim 4, wherein the heat conduction sheet is spirally wound around an outer surface of the cylindrical cushion.

6. The heat dissipation structure of claim 1, further comprising a housing, wherein the heat conduction sheet is over a bottom portion of the housing.

7. The heat dissipation structure of claim 6, further comprising a cooling pipe extending through a portion of the housing.

8. The heat dissipation structure of claim 1, further comprising a housing, wherein the heat conduction sheet extends through a portion of the housing.

9. A battery comprising:
a housing;
a battery cell inside the housing; and
a heat dissipation structure for dissipating heat from the battery cell, wherein the heat dissipation structure comprises:
  a heat conduction sheet in a spirally wound shape, wherein the heat conduction sheet extends in a first direction, and the heat conduction sheet is configured to conduct heat from the battery source;
  a cushion, wherein a deformability of the cushion is greater than a deformability of the heat conduction sheet, and is on an annular inner surface of the heat conduction sheet; and
  a through passage extending in the first direction, wherein the cushion surrounds the through passage.

10. The battery of claim 9, further comprising an adhesion layer on an annular outer surface of the heat conduction sheet.

11. The battery of claim 9, wherein
the cushion comprises a spiral cushion spirally wound along the annular inner surface of the heat conduction sheet.

12. The battery of claim 9, further comprising a cooling agent in the housing.

13. The battery of claim 12, wherein the heat dissipation structure is between the battery cell and the cooling agent.

14. The battery of claim 9, wherein
the cushion comprises a cylindrical cushion having the through passage in a longitudinal direction thereof.

15. The battery of claim 14, wherein the heat conduction sheet is spirally wound around an outer surface of the cylindrical cushion.

16. The battery of claim 15, wherein the cylindrical cushion is configured to enable the cooling agent to flow in the through passage.

17. The battery of claim 9, further comprising a second battery cell inside the housing, wherein the heat dissipation structure is between the battery cell and the second battery cell.

18. The battery of claim 17, further comprising a second heat dissipation structure, wherein the second heat dissipation structure is between the battery cell and the second battery cell.

19. The battery of claim 9, further comprising a second battery cell inside the housing, wherein the heat dissipation structure is between the battery cell and the housing, and the heat dissipation structure is between the second battery cell and the housing.

20. The battery of claim 9, wherein the heat dissipation structure extends through a portion of the housing.

* * * * *